(12) United States Patent
Nakamura

(10) Patent No.: US 11,985,453 B2
(45) Date of Patent: May 14, 2024

(54) DISPLAY METHOD AND DISPLAY SYSTEM

(71) Applicant: SEIKO EPSON CORPORATION, Tokyo (JP)

(72) Inventor: Yasuhiro Nakamura, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 17/824,961

(22) Filed: May 26, 2022

(65) Prior Publication Data

US 2022/0385868 A1 Dec. 1, 2022

(30) Foreign Application Priority Data

May 26, 2021 (JP) .................. 2021-088216

(51) Int. Cl.
*H04N 9/31* (2006.01)
*H04N 23/61* (2023.01)
(Continued)

(52) U.S. Cl.
CPC .......... *H04N 9/3185* (2013.01); *H04N 23/61* (2023.01); *H04N 23/635* (2023.01); *H04N 23/80* (2023.01); *A23L 5/10* (2016.08)

(58) Field of Classification Search
CPC . G02B 30/56; G06F 3/01; G06F 3/011; G06F 3/017; G06F 3/0425; H04N 9/3185; H04N 9/3179; H04N 9/29; H04N 9/3147; H04N 9/31; H04N 9/3194; H04N 23/61; H04N 23/635; H04N 23/80; H04N 9/3188; H04N 9/3102; H04N 9/317; H04N 9/3173; G06T 7/0008; G06T 7/001; G06T 7/74; G06T 7/70; G06T 7/73; G06T 7/32; G06T 7/33; A23L 5/10; G01S 17/08; G01S 7/4802; G01S 7/4808; G01S 17/88; G01S 17/42; G03B 21/142; G03B 17/54;
(Continued)

(56) References Cited

U.S. PATENT DOCUMENTS 6,334,684 B1 1/2002 Yoshida et al.
7,827,058 B2 * 11/2010 Mortimer .......... G06Q 30/0234
705/14.1
(Continued)

FOREIGN PATENT DOCUMENTS

JP H11-266944 10/1999
JP 2010-191745 9/2010
(Continued)

OTHER PUBLICATIONS

YouTube Video, "DSE 2019: Epson Talks About Its LightScene Laser Projector for Digital Signage Retail Applications," https://www.youtube.com/watch?v=qZg_rsIFEPE, Accessed on May 25, 2022—1 page.

*Primary Examiner* — Robert J Hance
*Assistant Examiner* — Humam M Satti
(74) *Attorney, Agent, or Firm* — Dority & Manning, P.A.

(57) ABSTRACT

A display method includes imaging a captured image containing a first marker placed on a surface and a second marker placed on the surface, and displaying a first image corresponding to the first marker and a second image corresponding to the second marker in an arrangement corresponding to an arrangement of the first marker and the second marker in the captured image on the surface.

6 Claims, 12 Drawing Sheets

(51) Int. Cl.
*H04N 23/63* (2023.01)
*H04N 23/80* (2023.01)
*A23L 5/10* (2016.01)

(58) Field of Classification Search
CPC ............ G03B 21/53; G03B 21/12–147; G03B 21/2046; G03B 21/26; G03B 21/30; G03B 21/34; G03B 21/36; G03B 21/43; G03B 21/56–58
See application file for complete search history.

(56) References Cited

U.S. PATENT DOCUMENTS

| | | | | |
|---|---|---|---|---|
| 10,825,044 | B2* | 11/2020 | Iannone | G06K 19/06028 |
| 10,984,064 | B1* | 4/2021 | Iannone | G06F 16/245 |
| 2010/0276495 | A1* | 11/2010 | Goldstein | B42D 25/47 |
| | | | | 235/488 |
| 2012/0179665 | A1* | 7/2012 | Baarman | G16H 20/60 |
| | | | | 707/E17.014 |
| 2012/0313910 | A1 | 12/2012 | Haraguchi et al. | |
| 2015/0014417 | A1* | 1/2015 | Finlow-Bates | H04N 21/6581 |
| | | | | 235/494 |
| 2015/0199751 | A1* | 7/2015 | Bryant | G06Q 30/0603 |
| | | | | 705/27.2 |
| 2015/0310539 | A1* | 10/2015 | McCoy | G06Q 30/0639 |
| | | | | 705/27.1 |
| 2016/0188124 | A1* | 6/2016 | Ono | H04N 9/3114 |
| | | | | 345/156 |
| 2017/0076428 | A1* | 3/2017 | Ishikawa | G06V 20/20 |
| 2017/0171521 | A1* | 6/2017 | Jung | H04N 9/3179 |
| 2019/0156077 | A1* | 5/2019 | Wilbert | G06Q 10/087 |
| 2020/0134877 | A1* | 4/2020 | Gould | G06T 11/00 |
| 2020/0195900 | A1* | 6/2020 | Sodhi | H04N 9/3194 |
| 2020/0275069 | A1* | 8/2020 | Tanaka | H04N 9/3185 |
| 2021/0097719 | A1* | 4/2021 | Kulbida | G03B 21/132 |
| 2021/0158502 | A1* | 5/2021 | Goto | G06T 7/62 |

FOREIGN PATENT DOCUMENTS

| | | |
|---|---|---|
| JP | 2012-256000 | 12/2012 |
| JP | 2015-144344 | 8/2015 |
| WO | WO2019/017023 | 1/2019 |

* cited by examiner

DISPLAY METHOD AND DISPLAY SYSTEM

The present application is based on, and claims priority from JP Application Serial Number 2021-088216, filed May 26, 2021, the disclosure of which is hereby incorporated by reference herein in its entirety.

BACKGROUND

1. Technical Field

The present disclosure relates to a display method and a display system.

2. Related Art

In related art, a technique for supporting a worker by projecting an image relating to a procedure of work including cooking on a proximity of a work object is developed. For example, JP-A-2010-191745 discloses a cooking support apparatus including a digital camera, a projector, an identification processor, a cooking method determiner, and a cooking method instructor. The digital camera images ingredients mounted on a cooking counter of a system kitchen. The identification processor identifies kinds of the ingredients on the captured image, and the cooking method determiner determines a cooking method for the identified ingredients. The cooking method instructor controls the projector to project an image showing the cooking method for the identified ingredients. The image projected by the projector is superimposed and displayed on the ingredients mounted on the cooking counter.

In the above described JP-A-2010-191745, the image is displayed on or near the ingredients, and there is no description that a user determines the display position of the image. However, it is predicted that various items including materials and tools used for work are arranged on a workbench during the work. When the display position of the image is determined in advance, the image may be displayed on the items and, in this case, it may be difficult for the user to know the contents of the image.

SUMMARY

A display method according to an aspect of the present disclosure includes imaging a captured image containing a first marker placed on a projection surface and a second marker placed on the projection surface, and displaying a first image corresponding to the first marker and a second image corresponding to the second marker in an arrangement corresponding to an arrangement of the first marker and the second marker in the captured image on the projection surface.

A display system according to an aspect of the present disclosure includes an imaging device imaging a captured image containing a first marker placed on a projection surface and a second marker placed on the projection surface, and a projection device displaying a first image corresponding to the first marker and a second image corresponding to the second marker in an arrangement corresponding to an arrangement of the first marker and the second marker in the captured image on the projection surface.

DESCRIPTION OF EXEMPLARY EMBODIMENTS

Figure 1:
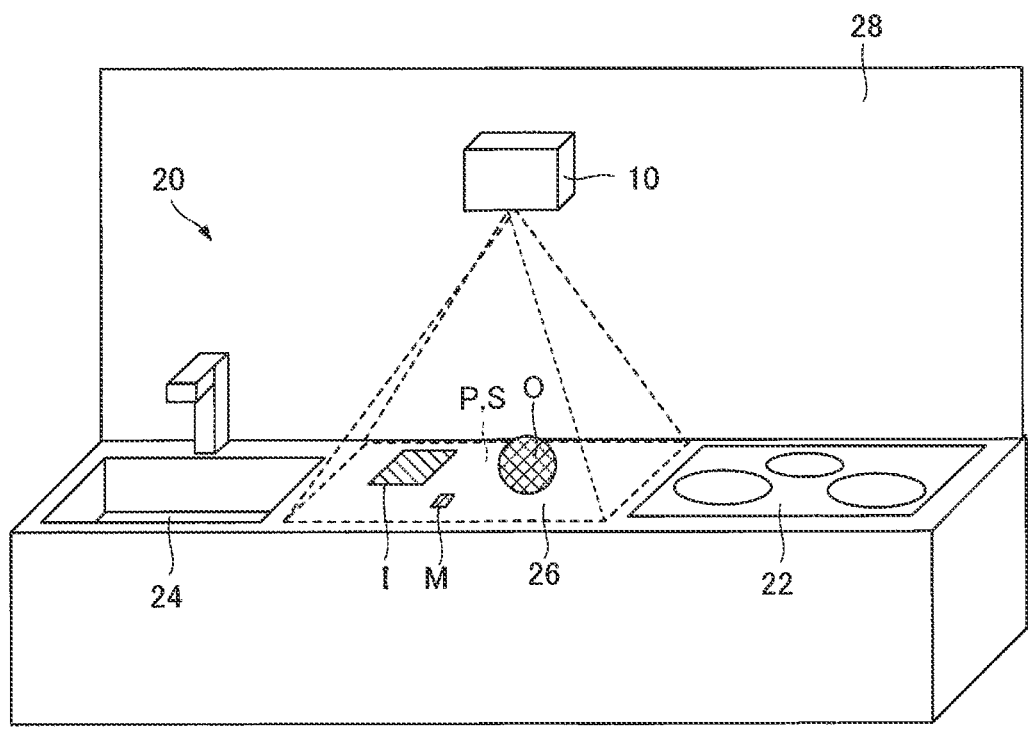
FIG. 1 shows an outline of a projector according to a first embodiment.

As below, preferred embodiments according to the present disclosure will be explained with reference to the accompanying drawings. Note that, in the drawings, the dimensions and scales of the respective parts are appropriately different from real ones and some parts are schematically shown to facilitate understanding. Further, the scope of the present disclosure is not limited to these embodiments unless there is some particular description that limits the present disclosure in the following explanation.

First Embodiment

FIG. 1 shows an outline of a projector 10 according to a first embodiment. The projector 10 according to the embodiment is an example of a display system including an imaging device 11 and a projection device 12. The projector 10 displays a projection image I on a projection surface P. In the embodiment, the projector 10 displays the projection image I relating to a procedure of cooking on a cooking counter 26 of a kitchen 20. The kitchen 20 includes e.g. a cooking range 22, a sink 24, the cooking counter 26, etc.

The projector 10 is attached to a wall surface 28 stood from the cooking counter 26 of the kitchen 20. In the embodiment, the housing of the projector 10 has a rectangular parallelepiped shape, and an imaging lens 11A of the imaging device 11 and a projection lens 12A of the projection device 12, which will be described later with reference to FIG. 2, are exposed from a surface facing the cooking counter 26.

In the embodiment, the projection surface P of the projection device 12 is adjusted to include substantially the entire area of the cooking counter 26. Further, an imaging area S of the imaging device 11 is adjusted to include the entire area of the projection surface P. The imaging area S of the imaging device 11 preferably includes the entire area of the projection surface P, and may include a wider area than the projection surface P. In the embodiment, for convenience of explanation, the projection surface P and the imaging area S are in the same range. Further, in the embodiment, the projection surface P is on the cooking counter 26, however, for example, may include at least a part of the cooking range 22 or the sink 24.

A marker M is placed on the projection surface P. The details will be described later, but the marker M is for specification of contents of the projection image I projected on the projection surface P and specification of the display position of the projection image I on the projection surface P. In FIG. 1, the single marker M and the single projection image I are respectively shown, however, in use, a plurality of markers M are placed within the imaging area S and a plurality of projection images I corresponding to the respective markers M are projected on the projection surface P. An object O is placed on the projection surface P. The details will be described later, but the projection image I has contents relating to the object O.

Figure 2:
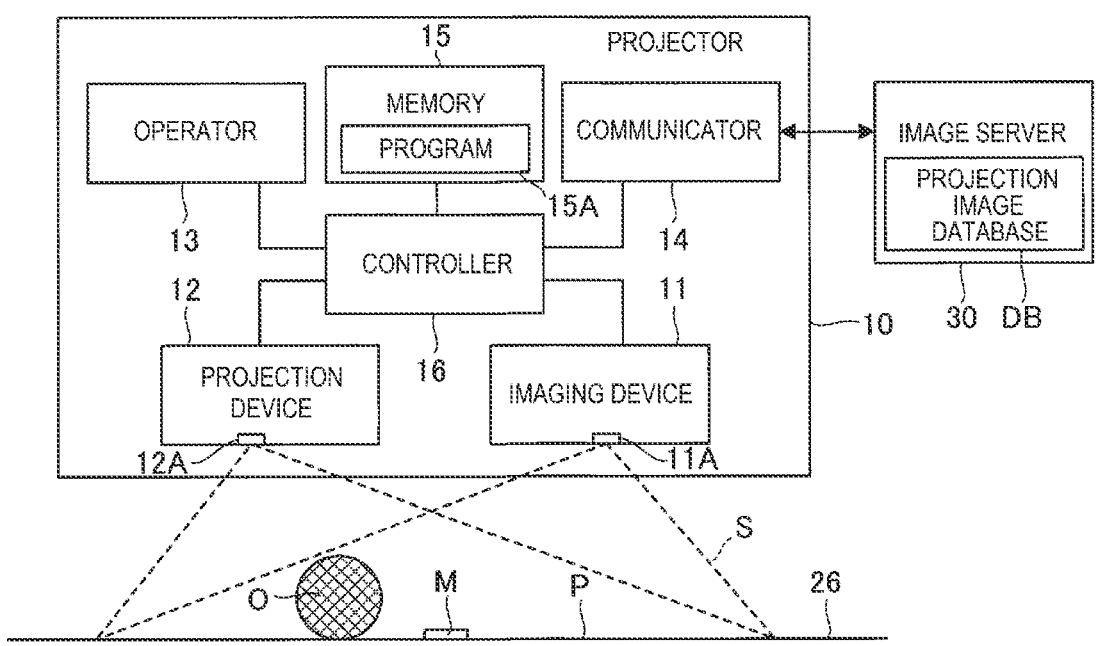
FIG. 2 is a block diagram showing a configuration of the projector according to the first embodiment.

FIG. 2 is a block diagram showing a configuration of the projector 10. The projector 10 includes the imaging device 11, the projection device 12, an operator 13, a communicator 14, a memory 15, and a controller 16.

The imaging device 11 is a camera including e.g. a CCD (Charge Coupled Device) or a CMOS (Complementary Metal Oxide Semiconductor) as an image element that converts collected light into an electrical signal. As below, for simplicity of explanation, the imaging device 11 captures a still image. Note that the imaging device 11 may capture a moving image instead of capturing the still image. As described above, in the embodiment, the imaging area S of the imaging device 11 includes the entire area of the projection surface P of the projection device 12 on the cooking counter 26. Therefore, the captured image of the imaging device 11 contains items placed on the cooking counter 26 e.g. the object O and the marker M.

The projection device 12 includes a liquid crystal light valve, a projection lens, and a liquid crystal driver for projection of the projection image I. Further, the projection device 12 includes e.g. a super high-pressure mercury lamp or a metal halide lamp as a light source. For example, the projection device 12 acquires projection image data from the controller 16 and projects the projection image I represented by the acquired projection image data on the projection surface P on the cooking counter 26.

The operator 13 receives an instruction operation to the projector 10 from the user. The operator 13 may be e.g. a touch panel using a display provided on the housing of the projector 10, an operation button provided on the housing, or the like. When the operator 13 is a touch panel, the operator 13 outputs data representing a detected touch position to the controller 16. Alternatively, when the operator 13 is an operation button, the operator 13 outputs data for identification of the pressed button to the controller 16. Thereby, the details of the instruction operation to the operator 13 by the user are transmitted to the controller 16.

The communicator 14 is e.g. a network card such as a wireless LAN (Local Area Network) card. The communicator 14 connects to a wide area communication network such as the Internet via a router provided nearby. Then, the communicator 14 connects to an image server 30 connected to the wide area communication network and transmits and receives various kinds of information between the image server 30 and itself. In the image server 30, a projection image database DB in which a plurality of pieces of projection image data D (see FIG. 10) are stored is provided. The projection image I shown in FIG. 1 etc. is visualization of the projection image data D by the projection device 12. The communicator 14 transmits an image transmission request to request transmission of the projection image data D to the image server 30 under control by the controller 16. Further, the communicator 14 receives the projection image data D transmitted from the image server 30 and outputs the data to the controller 16.

Figures 9, 10:
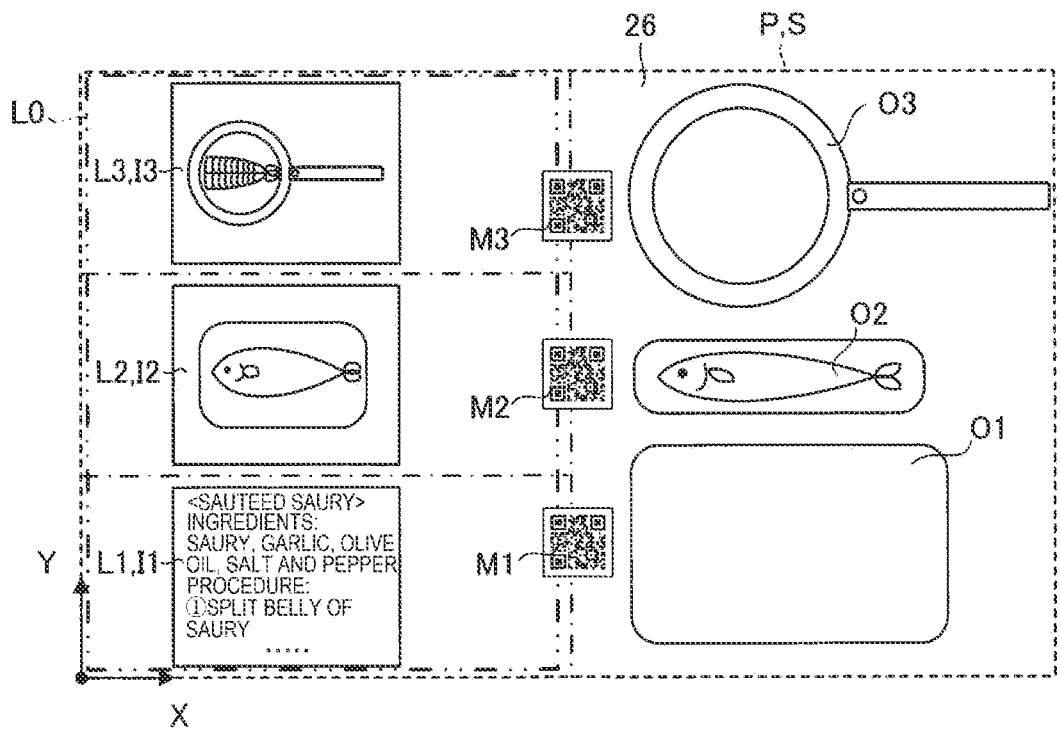
FIG. 9 schematically shows another arrangement of the projection images in the first embodiment.
FIG. 10 schematically shows a projection image database.

FIG. 10 schematically shows the projection image database DB. In the projection image database DB, the plurality of pieces of projection image data D are stored. The projection image data D may be e.g. still image data having an extension "jpg" or the like, or moving image data having an extension "mp4" or the like. In the embodiment, the projection image data D records images relating to a procedure for cooking a predetermined dish. The images relating to a procedure for cooking a predetermined dish include e.g. still images showing text information representing names and quantities of ingredients, moving images formed by imaging of ways of cutting and treating the ingredients, etc. That is, in the projection image database DB of the embodiment, a plurality of pieces of projection image data D are formed as a set with respect to each dish to be cooked. For example, for a dish having a procedure of preparing ingredients (step 1), cutting the ingredients (step 2), and heating the ingredients (step 3), three images of a still image (image 1) showing text information representing names and quantities of ingredients and the steps of cooking, a moving image (image 2) formed by imaging of the way of cutting the ingredients, and a moving image (image 3) formed by imaging of a state of heating the ingredients form a set.

These images are created to form pairs with objects O such as a cooking tool, an ingredient, etc. used for cooking. For example, the image 1 is created to correspond to a cutting board mainly used for a non-heating process of the cooking, the image 2 is created to correspond to an ingredient cut at the step 2, and the image 3 is created to correspond to a cooking tool heating the ingredient. That is, when the image 1 is a first image, the cutting board is a first object, the image 2 is a second image, and the ingredient cut at the step 2 is a second object, the first image is an image relating to the details of work using the first object and the second image is an image relating to the details of work using the second object. As will be described later, the user may place the marker M of the image corresponding to the object O in the proximity of the object O placed on the cooking counter 26, to thereby cause an image corresponding to the object to be displayed O around the object O.

Image identification information N is identification information for unique identification of each projection image data D. In the embodiment, the image identification information N contains a three-digit number as dish identification information for identification of a dish and a three-digit number as step identification information for identification of a step. In the example shown in FIG. 10, the dish of the dish identification information 053 contains three images (053_001.jpg, 053_002.mp4, 053_003.mp4). 053_001.jpg corresponds to e.g. the above described (image 1), 053_002.mp4 corresponds to e.g. the above described (image 2), and 053_003.mp4 corresponds to e.g. the above described (image 3).

The image server 30 may specify a memory area of the projection image data D corresponding to the image identification information N by searching the projection image database DB using the image identification information N as an index. That is, the image identification information N is information for specification of a recording location of a predetermined projection image.

Note that, in the embodiment, when a plurality of projection images are projected, the projection areas for the respective projection images have the same size. Accordingly, it is preferable that the aspect ratios and the image sizes of the projection images stored in the projection image database DB are the same. Further, the above described format of the image identification information N is an example, and the image identification information N may have any format as long as the respective projection image data D may be uniquely identified. For example, serial numbers are assigned to all of the projection image data D within the projection image database DB and the serial numbers may be used as the image identification information N.

The memory 15 shown in FIG. 2 is a recording medium readable by the controller 16. The memory 15 includes e.g. a non-volatile memory and a volatile memory. The non-volatile memory is e.g. a ROM (Read Only Memory), an EPROM (Erasable Programmable Read Only Memory), or an EEPROM (Electrically Erasable Programmable Read Only Memory). The volatile memory is e.g. a RAM (Random Access Memory).

In the non-volatile memory of the memory 15, a program 15A executed by the controller 16 is stored in advance. The volatile memory of the memory 15 is used as a work area for execution of the program 15A by the controller 16. The program 15A may be also referred to as "application program", "application software", or "app". The program 15A is acquired from e.g. a server (not shown) or the like via the communicator 14, and then, stored in the memory 15.

The controller 16 shown in FIG. 2 includes a processor e.g. a CPU (Central Processing Unit) or the like, i.e., a computer. The controller 16 may be formed by a single computer or a plurality of computers. The controller 16 reads out the program 15A from the non-volatile memory into the volatile memory at a chance of an operation to give an instruction to start execution of the program 15A is performed on the operator 13. The controller 16 executes the program read out in the volatile memory.

Figure 3:
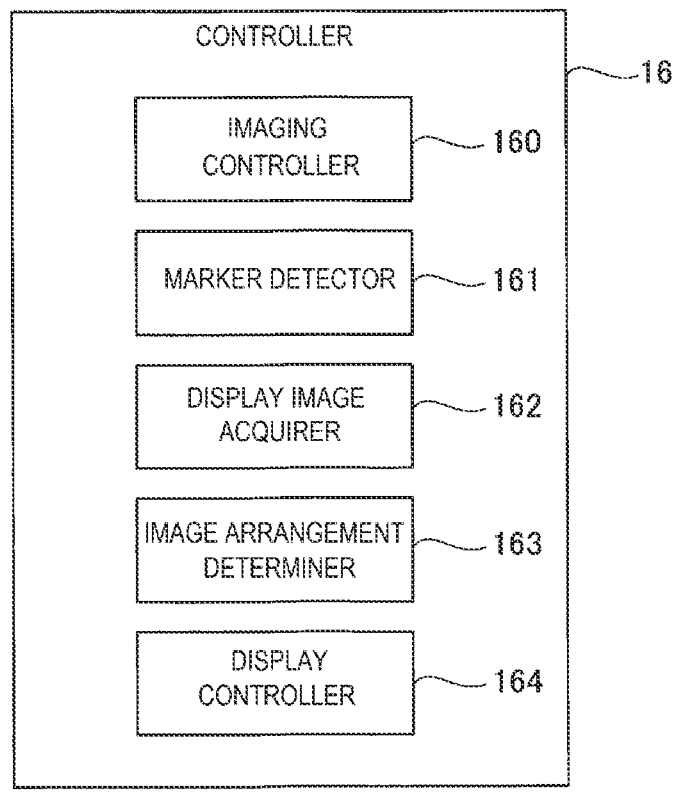
FIG. 3 is a block diagram showing a functional configuration of a controller according to the first embodiment.

FIG. 3 is a block diagram showing a functional configuration of the controller 16. The controller 16 in operation according to the program 15A functions as an imaging controller 160, a marker detector 161, a display image acquirer 162, an image arrangement determiner 163, and a display controller 164 shown in FIG. 3. The imaging controller 160, the marker detector 161, the display image acquirer 162, the image arrangement determiner 163, and the display controller 164 shown in FIG. 3 are software modules realized by the operation of the controller 16 according to the program 15A.

Figure 4A:
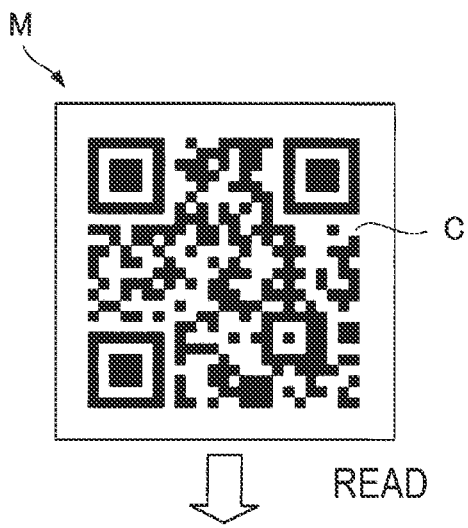
FIGS. 4A and 4B schematically show an appearance etc. of a marker in the first embodiment.
Figure 4B:
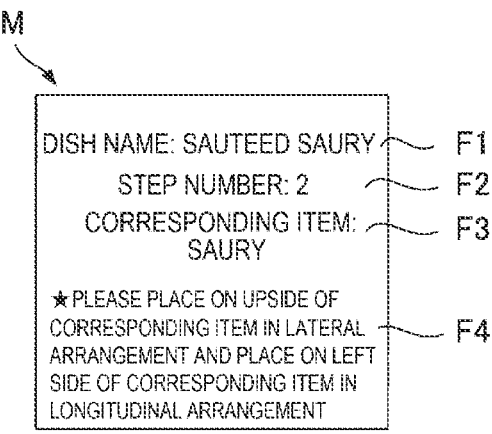

Prior to the explanation of the respective functional parts of the controller 16, the marker M is explained. FIGS. 4A and 4B schematically show an appearance etc. of the marker M in the first embodiment. More specifically, FIG. 4A shows a front face of the marker M and FIG. 4B shows a back face of the marker M. In the embodiment, the marker M is e.g. a plate-like member substantially in several centimeters square. In the embodiment, the marker M is used in the kitchen 20, and it is preferable that the marker is waterproofed using a water-resistant material, having a waterproofed surface, or printed using water-proof ink. The marker M may be packaged with the projector 10 when the projector 10 is purchased or added as a supplement to a cooking book, a magazine, or the like. Alternatively, the marker M may be obtained by printing of print data downloaded from a homepage of a manufacturer of the projector 10, a food manufacturer, or the like, a recipe posting site, or the like by the user using a printer.

As shown in FIG. 4A, a two-dimensional code C e.g. a QR code (registered trademark) or the like is added to the front face of the marker M. When the marker M is placed in the imaging area S of the imaging device 11 and the two-dimensional code C is within the captured image of the imaging device 11, the marker detector 161 of the controller 16, which will be described later, functions as a two-dimensional code reader and calculates information represented by the two-dimensional code C. Note that the two-dimensional codes C of the plurality of markers M are respectively different and information obtained by reading of the respective markers M are different.

The information obtained by reading of the front face of the marker M, i.e., the information represented by the two-dimensional code C is the image identification information N for unique identification of specific image data from the plurality of pieces of projection image data D stored in the image server 30. As described above, the image identification information N contains the three-digit dish identification information and the three-digit step identification information. For example, the image identification information N shown by the two-dimensional code C exemplified in FIG. 4A is "053_002", and "053" is dish identification information and "002" is step identification information. The display image acquirer 162, which will be described later, includes the image identification information N in the image transmission request to the image server 30. Thereby, the display image acquirer 162 may obtain the projection image data D corresponding to the read marker M.

As shown in FIG. 4B, information for user F as information for the user is added to the back face of the marker M. In the embodiment, as the information for user F, dish name information F1, step number information F2, object information F3, and arrangement information F4 are displayed.

The dish name information F1 corresponds to the dish identification information of the image identification information N and represents the name of the dish for which the procedure of cooking is shown by the image displayed using the marker M. In the example of FIG. 4B, "sauteed saury" is displayed as the dish name information F1. The step number information F2 corresponds to the step identification information of the image identification information N and represents the number of the step relating to the image displayed using the marker M. In the example of FIG. 4B, "2" is displayed as the step number information F2.

The object information F3 represents the object O relating to the image displayed using the marker M. In the example of FIG. 4B, "saury" is displayed as the object information F3. Note that, in the description on the marker M, as a term corresponding to "object", a term "corresponding item" showing an item corresponding to the marker M is used. The arrangement information F4 shows an arrangement in which the marker M is placed with respect to the object O. In example of FIG. 4B, "please place on upside of corresponding item in lateral arrangement and place on left side of corresponding item in longitudinal arrangement" is displayed as the arrangement information F4. The lateral arrangement and the longitudinal arrangement are arrangement directions in which the plurality of markers M are arranged and also referred to as "marker arrangement".

The user may know which dish and what number of the step shown by the image displayed by the marker M and which position to place the marker M with respect to the object O by reading the information for user F. In the example of FIG. 4B, the user grasps that the marker M is for display of the image relating to the "2nd" step of cooking "sauteed saury" by reading the dish name information F1 and the step number information F2. Further, user grasps placement of the marker M on "upside or left side" of "saury" as the ingredient of the sauteed saury by reading the object information F3 and the arrangement information F4.

In the embodiment, the front face and the back face are provided on the marker M and the two-dimensional code C and the information for user F are added to the faces, respectively, however, for example, the two-dimensional code C and the information for user F may be added to the front face of the marker M. Alternatively, not limited to the image identification information N recorded in the two-dimensional code C, but e.g. a one-dimensional code such as a barcode may be used, or the image identification information N written by numerals and characters may be read by OCR (Optical Character Recognition).

Next, a method of using the marker M is explained. The user prepares a set of markers M relating to a dish to cook this time for using the projector 10. In this regard, the user distinguishes the marker M for a desired dish by reading the dish name information F1 displayed on the back face of the marker M. Note that, as the information for user F, the number of steps included in the cooking process of the dish, i.e., the number of markers M included in the set of markers M relating to the cooking may be displayed. Thereby, the user may easily prepare all of the necessary markers M. The user prepares the objects O described in the object information F3 displayed on the back faces of the respective markers M and place the objects on the cooking counter 26. In this regard, it is preferable for the user to arrange the objects O in the order of the numbers described in the step number information F2. Thereby, the projection images I are displayed in the order along the flow of the cooking process and the user may smoothly grasp the procedure of the cooking.

Subsequently, the user places the markers M corresponding to the respective objects O in the proximities of the objects O placed on the cooking counter 26. In this regard, it is preferable for the user to place the markers M according to the arrangement described in the arrangement information F4. Here, for example, the user may place only a part of the set of markers M relating to the dish cooked this time on the cooking counter 26. The number of markers M of the set may be large for e.g. a dish using many ingredients and having a complex cooking process. In this case, for example, the markers M may be placed on the cooking counter 26 in several batches.

Figure 5:
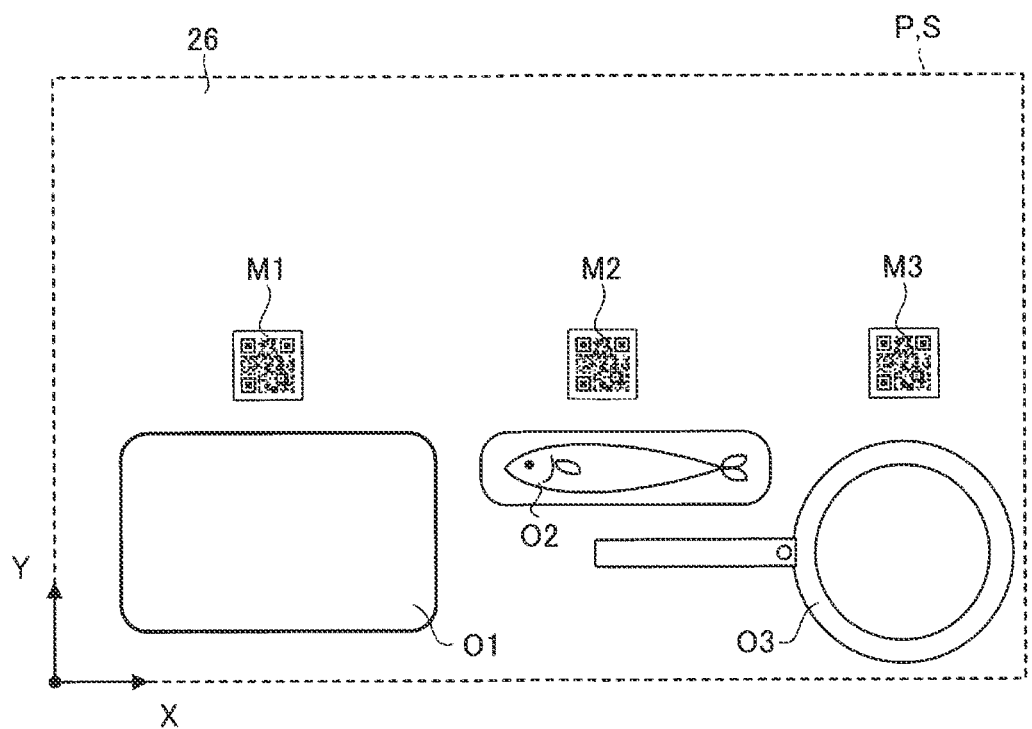
FIG. 5 schematically shows an arrangement state of markers in the first embodiment.

FIG. 5 schematically shows an arrangement state of the markers M. FIG. 5 shows a part to be the projection surface P and the imaging area S of the cooking counter 26 from above. The projection surface P forms an XY-plane with an X-axis along the lateral direction as seen from the user standing facing the cooking counter 26 and a Y-axis along the depth direction. In the following explanation, a case where the user cooks "sauteed saury" will be explained. The dish identification information of the sauteed saury is "053". Further, the sauteed saury includes three steps and has three step numbers 001, 002, 003. Accordingly, the image identification information N of the images relating to the sauteed saury is 053_001, 053_002, 053_003. Further, the objects O correlated with the respective steps are step 1: cutting board, step 2: saury, step 3: frying pan.

As below, the markers M used for cooking "sauteed saury" are markers M1, M2, M3. The two-dimensional code C showing "053_001" is added to the front face of the marker M1, the two-dimensional code C showing "053_002" is added to the front face of the marker M2, and the two-dimensional code C showing "053_003" is added to the front face of the marker M3. As described above, the image identification information N of the images relating to the sauteed saury is 053_001, 053_002, 053_003. Therefore, when the marker M1 is a first marker, 053_001.jpg is a first image, 053_001 as the image identification information N of 053_001.jpg is first information, the first information used for specification of the recording location of the first image is added to the first marker. Further, when the marker M2 is a second marker, 053_002.mp4 is a second image, 053_002 as the image identification information N of 053_002.mp4 is second information, the second information used for specification of the recording location of the second image is added to the second marker.

On the back faces of the markers M1, M2, M3, "sauteed saury" is respectively indicated as the dish name information F1. "1" is indicated as the step number information F2 on the back face of the marker M1, "2" is indicated as the step number information F2 on the back face of the marker M2, and "3" is indicated as the step number information F2 on the back face of the marker M3. Further, "cutting board" is indicated as the object information F3 on the back face of the marker M1, "saury" is indicated as the object information F3 on the back face of the marker M2, and "frying pan" is indicated as the object information F3 on the back face of the marker M3.

Accordingly, when the marker M1 is a first marker and the cutting board is a first object, the first marker corresponds to the first object used for work performed by the user. Further, when the marker M2 is a second marker and the saury is a second object, the second marker corresponds to the second object used for the work. Furthermore, as the object information F3 in FIG. 4, the first marker contains an indication showing that the first marker is the marker corresponding to the first object to the user and the second marker contains an indication showing that the second marker is the marker corresponding to the second object to the user.

On the back faces of the markers M1, M2, M3, "please place on upside of corresponding item in lateral arrangement and place on left side of corresponding item in longitudinal arrangement" is indicated as the arrangement information F4. Note that, regarding the arrangement of the markers M and the objects O, "upside" refers to the deep side when the user faces the cooking counter 26.

The user prepares the three markers M1, M2, M3 with description "sauteed saury" as the dish name information F1 on the back faces. Further, the user prepares the objects O described in the object information F3 of the markers M1, M2, M3. Specifically, the user prepares a cutting board O1 described on the marker M1, a saury O2 described on the marker M2, and a frying pan O3 described on the marker M3.

The user places the prepared objects O1 to O3 on the cooking counter 26. In this regard, the user places the objects O in line in the order of the step numbers corresponding to the respective objects O. In the example of FIG. 5, the cutting board O1 corresponding to step 1, the saury O2 corresponding to step 2, and the frying pan O3 corresponding to step 3 are placed from left to right. Further, the user places the markers M1 to M3 corresponding to the respective objects O1 to O3 on the cooking counter 26. In the example of FIG. 5, the objects O1 to O3 are arranged in the lateral direction. Therefore, the example of FIG. 5 corresponds to "lateral arrangement" in arrangement information F4, and the user sequentially places the markers M1 to M3 from left to right on the upsides of the respective objects O1 to O3. Note that the objects O1 to O3 may be placed from right to left. In this case, the markers M1 to M3 are also placed from right to left.

Note that, for example, as shown in FIG. 9, the cutting board O1 corresponding to the step 1, the saury O2 corresponding to the step 2, and the frying pan O3 corresponding to the step 3 may be placed from the near side toward the deep side. This arrangement corresponds to "longitudinal arrangement" in the arrangement information F4, and the user places the markers M1 to M3 on the left sides of the respective objects O1 to O3. Alternatively, the objects O1 to O3 may be placed from the deep side toward the near side. In this case, the markers M1 to M3 are also placed from the deep side toward the near side.

Subsequently, the respective functional parts of the controller 16 will be explained with reference to FIG. 3. The imaging controller 160 controls capture of images by the imaging device 11. The imaging controller 160 controls e.g. times of imaging in the imaging device 11. For example, the time of imaging may be determined by reception of an instruction of imaging from the user using the operator 13. Alternatively, for example, the imaging device 11 may constantly capture a moving image and, when no motion of objects within the imaging area S continues for a predetermined time or more, one frame of the moving image may be extracted and used as a captured image. In the embodiment, the imaging controller 160 receives an instruction of imaging from the user using the operator 13.

Further, the imaging controller 160 acquires image data of the captured image of the imaging device 11 from the imaging device 11. In the embodiment, a captured image with two or more markers M therein is imaged using the imaging device 11. That is, the imaging device 11 images a captured image containing the first marker M1 placed on the cooking counter 26 as the projection surface P and the second marker M2 placed on the projection surface P. Therefore, for example, the imaging controller 160 may report an error to the user and prompt re-imaging when two or more markers M are not contained within the captured image.

The marker detector 161 detects the markers M from the captured image of the imaging device 11. Further, the marker detector 161 calculates information represented by the two-dimensional codes C added to the markers M and determines the positions of the plurality of markers M in the captured image. More specifically, the marker detector 161 detects the two-dimensional codes C added to the markers M from the captured image of the imaging device 11, and calculates the image identification information N according to the format of the two-dimensional codes C. That is, the marker detector 161 acquires the first information and the second information based on the captured image. In the embodiment, the marker detector 161 calculates "053_001" from the two-dimensional code C of the marker M1, "053_002" from the two-dimensional code C of the marker M2, and "053_003" from the two-dimensional code C of the marker M3, respectively.

As described above, there are two or more markers M on the captured image. The marker detector 161 detects the positions of the plurality of markers M. For example, in the example of FIG. 5, the marker detector 161 detects the positions of the three markers M1 to M3 arranged in the lateral direction. Further, in the example of FIG. 9, the marker detector 161 detects the positions of the three markers M1 to M3 arranged in the longitudinal direction.

The display image acquirer 162 acquires the projection image data D corresponding to the markers M from the image server 30. More specifically, the display image acquirer 162 transmits image transmission requests containing the image identification information N calculated from the two-dimensional codes C to the image server 30. The image server 30 transmits the projection image data D specified by the image identification information N to the projector 10. The display image acquirer 162 temporarily stores the projection image data D transmitted from the image server 30 in e.g. the memory 15. That is, the display image acquirer 162 acquires the first image from the recording location of the first image based on the first information. Further, the display image acquirer 162 acquires the second image from the recording location of the second image based on the second information.

In the embodiment, the display image acquirer 162 transmits three pieces of image identification information N, i.e., image transmission requests respectively containing "053_001", "053_002", "053_003" to the image server 30. Further, the display image acquirer 162 acquires three pieces of projection image data D, i.e., "053_001.jpg", "053_002.mp4", "053_003.mp4" in response to the image transmission requests.

Figure 6:
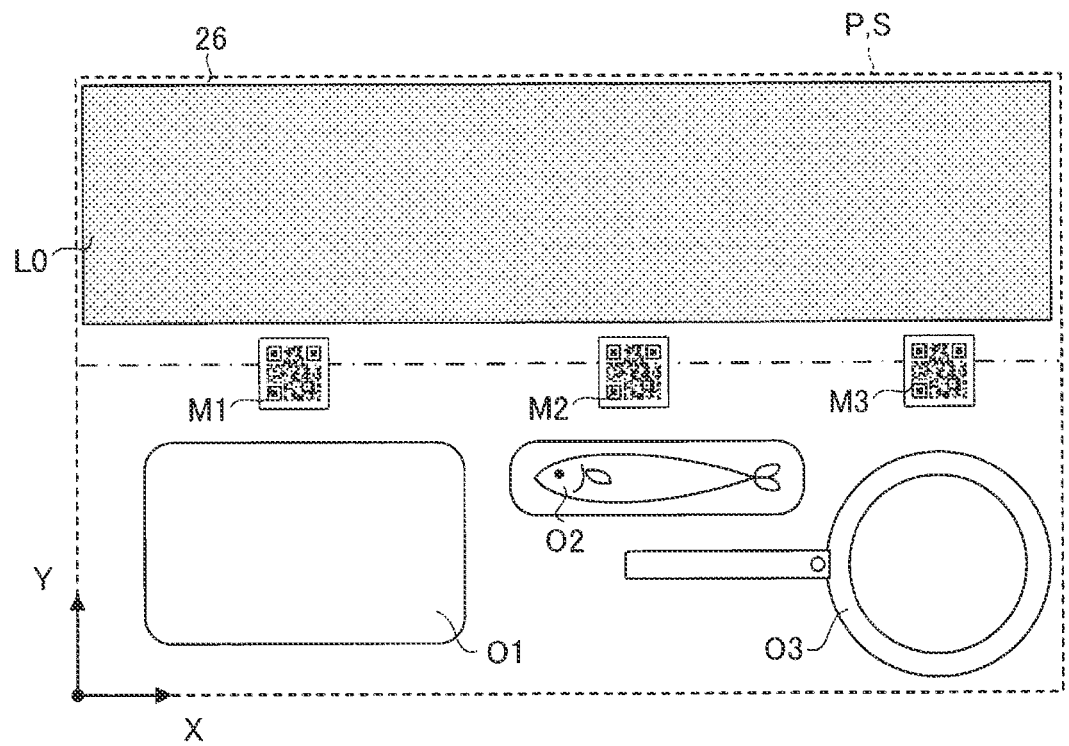
FIG. 6 schematically shows a determination method of an arrangement of projection images in the first embodiment.
Figure 7:
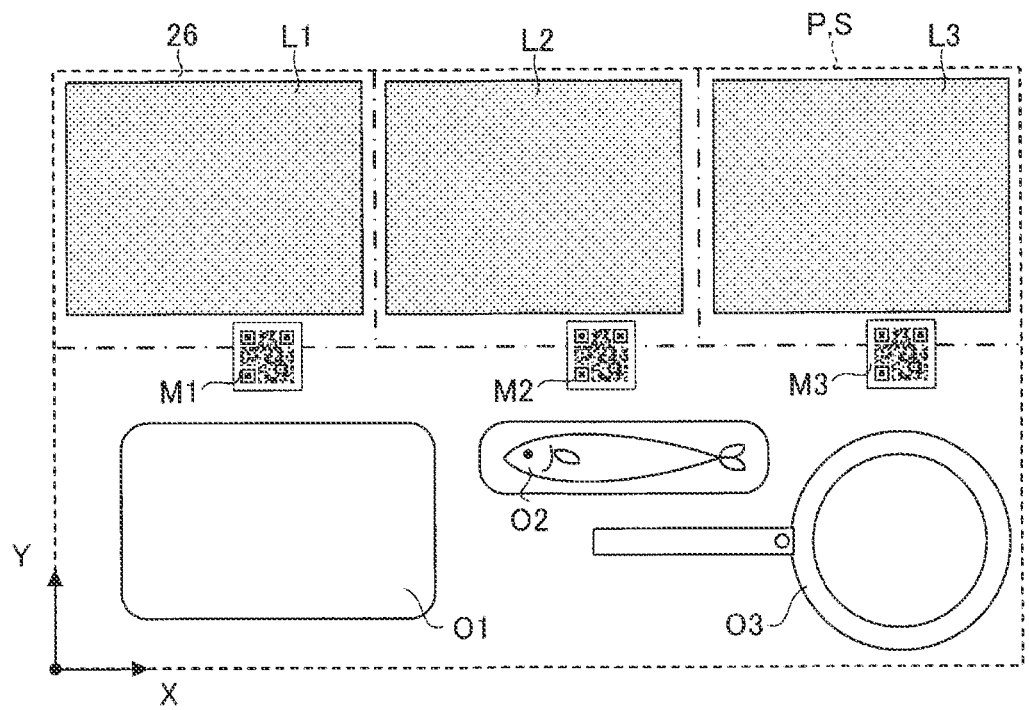
FIG. 7 schematically shows the determination method of the arrangement of the projection images in the first embodiment.

The image arrangement determiner 163 determines the arrangement of the projection images I on the projection surface P. More specifically, the image arrangement determiner 163 determines the arrangement direction of the projection images I based on the positions of the plurality of markers M in the captured image. FIGS. 6 and 7 schematically show a determination method of the arrangement of the projection images I. In FIG. 6, like FIG. 5, the plurality of markers M1 to M3 are arranged in the lateral direction. When the plurality of markers M1 to M3 are arranged in the lateral direction, the image arrangement determiner 163 sets the upside with respect to the markers M as a projection area L0. For the reason, placement of the markers M on "upside of corresponding item in lateral arrangement" is described as the arrangement information F4 of the markers M1 to M3. That is, the arrangement information F4 gives an instruction of positions to place the markers M so that the objects O and the projection images I may not overlap. Note that the image arrangement determiner 163 may place the projection images I on the downsides with respect to the markers M. In this case, in the arrangement information F4, placement of the markers M on "downside of corresponding item in lateral arrangement" is described. Alternatively, the arrangement of the projection images I with respect to the markers M may be designated by the user using the operator 13 or the like.

When the markers M are arranged in the lateral direction, the image arrangement determiner 163 determines the arrangement of the respective projection images I so that the projection images I corresponding to the respective markers M may be arranged in the lateral direction. Specifically, as shown in FIG. 7, the image arrangement determiner 163 divides the projection area L0 in three parts in the lateral direction and respectively sets a projection area L1 where the projection image I corresponding to the marker M1 is projected, a projection area L2 where the projection image I corresponding to the marker M2 is projected, and a projection area L3 where the projection image I corresponding to the marker M3 is projected. Note that, in FIGS. 6, 7, etc., in view of visual recognition, ends of the projection areas L (L0, L1, etc.) are located in positions apart from the ends of the projection surface P, however, the ends of the projection areas L may be the same as the ends of the projection surface P.

The display controller 164 controls the projection device 12 to project the projection images I on the projection surface P. More specifically, the display controller 164 controls the projection device 12 to project the projection images I on the projection surface P along the arrangement determined by the image arrangement determiner 163.

Figure 8:
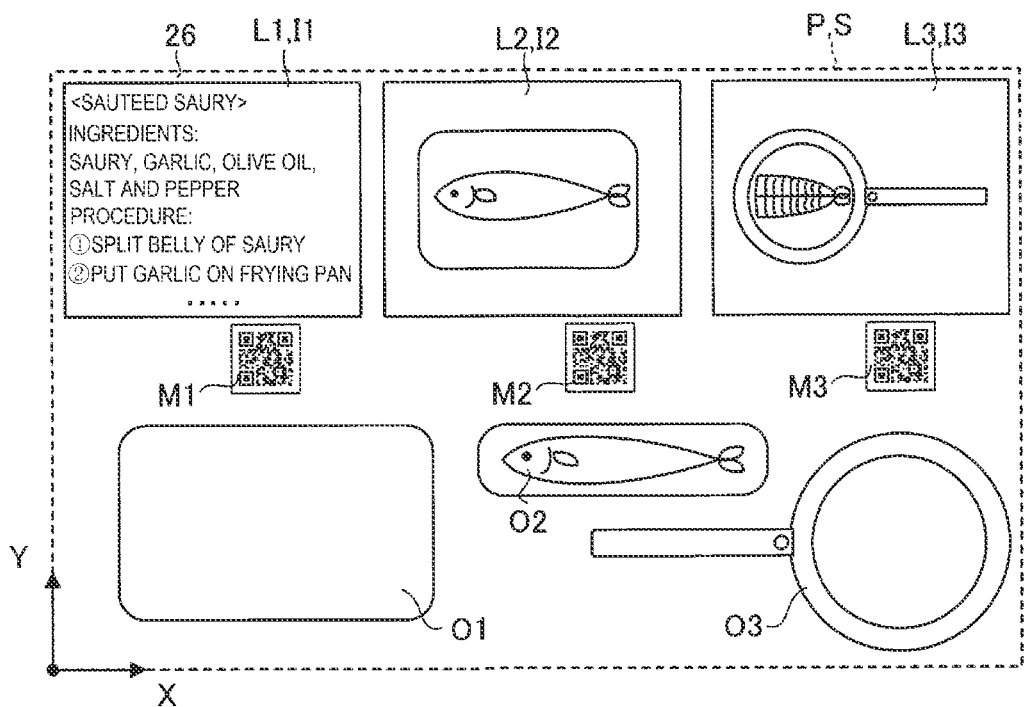
FIG. 8 schematically shows an arrangement of projection images in the first embodiment.

In the embodiment, as shown in FIG. 8, the display controller 164 controls the projection device 12 to display a projection image I1 of the projection image data "053_001.jpg" in the projection area L1 corresponding to the marker M1. Further, the display controller 164 controls the projection device 12 to display a projection image I2 of the projection image data "053_002.mp4" in the projection area L2 corresponding to the marker M2. Furthermore, the display controller 164 controls the projection device 12 to display a projection image I3 of the projection image data "053_003.mp4" in the projection area L3 corresponding to the marker M3.

That is, the projection device 12 displays the first image corresponding to the first marker and the second image corresponding to the second marker in the arrangement corresponding to the arrangement of the first marker and the second marker in the captured image on the projection surface P. In this regard, the arrangement direction of the first image and the second image on the projection surface P is the same as the arrangement direction of the first marker and the second marker in the captured image.

Note that, for example, as shown in FIG. 9, when the plurality of markers M1 to M3 are arranged in the longitudinal direction, the image arrangement determiner 163 sets the left side with respect to the markers M as a projection area L0. For the reason, placement of the markers M on "left side of corresponding item in longitudinal arrangement" is described as the arrangement information F4 of the markers M1 to M3. That is, the arrangement information F4 gives an instruction of positions to place the markers M so that the objects O and the projection images I may not overlap.

When the markers M are arranged in the longitudinal direction, the image arrangement determiner 163 determines the arrangement of the respective projection images I so that the projection images I corresponding to the respective markers M may be arranged in the longitudinal direction. Specifically, as shown in FIG. 9, the image arrangement determiner 163 divides the projection area L0 in three parts in the longitudinal direction and respectively sets the projection area L1 where the projection image I corresponding to the marker M1 is projected, the projection area L2 where the projection image I corresponding to the marker M2 is projected, and the projection area L3 where the projection image I corresponding to the marker M3 is projected.

The display controller 164 controls the projection device 12 to project the projection images I on the projection surface P along the arrangement determined by the image arrangement determiner 163. Note that, in projection from the projection device 12, the aspect ratios of the original projection images I are kept. Therefore, the scaling factors of the projection images I differ depending on the shapes of the projection areas L. For example, when there are projection areas L longer in the lateral direction as shown in FIG. 9, the projection images I having sizes according to the maximum scaling factor in the longitudinal direction are displayed.

Figure 11:
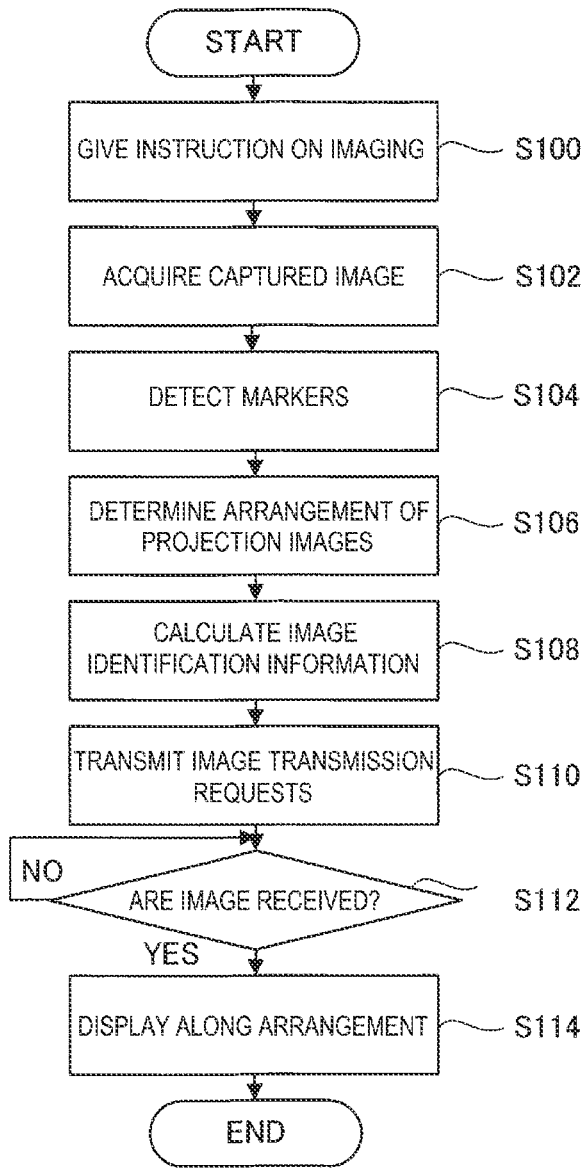
FIG. 11 is a flowchart showing a flow of a display method executed by the controller of the projector according to a program.

FIG. 11 is a flowchart showing a flow of a display method executed by the controller 16 of the projector 10 according to the program 15A. Prior to execution of the processing in FIG. 11, the user places the plurality of markers M and objects O on the projection surface P as shown in FIG. 5.

The controller 16 functions as the imaging controller 160 to instruct the imaging device 11 to image the imaging area S (step S100). Further, the controller 16 functions as the imaging controller 160 to acquire the captured image captured by the imaging device 11 (step S102).

The controller 16 functions as the marker detector 161 to detect the plurality of markers M from the captured image (step S104). The controller 16 functions as the image arrangement determiner 163 to determine the arrangement of the projection images I corresponding to the respective markers M (step S106). When the plurality of markers M are arranged in the lateral direction, the controller 16 arranges the projection images I in the lateral direction. Alternatively, when the plurality of markers M are arranged in the longitudinal direction, the controller 16 arranges the projection images I in the longitudinal direction.

The controller 16 functions as the marker detector 161 to respectively calculate the image identification information N shown by the two-dimensional codes C added to the respective markers M (step S108). The controller 16 functions as the display image acquirer 162 to transmit the image transmission requests of the projection image data D of the projection images corresponding to the respective image identification information N to the image server 30 (step S110). The controller 16 waits until receiving the projection images I from the image server 30 (step S112: Loop of NO).

When receiving the projection images I from the image server 30 (step S112: YES), the controller 16 functions as the display controller 164 to control the projection device 12 to display the projection images I received at step S112 along the arrangement determined at step S106 (step S114) and ends the processing of the flowchart. Note that, in the flowchart, step S106 and steps S108 to S112 may be in reverse order or the processing may be performed in parallel.

As described above, the projector 10 according to the first embodiment displays the projection image I1 corresponding to the marker M1 placed on the projection surface P and the projection image I2 corresponding to the marker M2 in the arrangement corresponding to the arrangement of the marker M1 and the marker M2 on the projection surface. Thereby, the user may change the arrangement of the projection images I1 and I2 on the projection surface P by changing the arrangement of the markers M1, M2, and may simply designate the projection positions of the projection images I.

Further, the projector 10 sets the arrangement direction of the projection image I1 and the projection image I2 on the projection surface P to be the same as the arrangement direction of the marker M1 and the marker M2 in the captured image, and thereby, the user may intuitively designate the arrangement of the projection images I.

The marker M1 corresponds to the cutting board O1 as the first object used for work performed by the user, the marker M2 corresponds to the saury O2 as the second object used for work, the projection image I1 is an image relating to the details of the work using the cutting board O1, and the projection image I2 is an image relating to the details of the work using the saury O2. Therefore, the user may refer to the images relating to the work using the objects O with respect to each individual object O, and work efficiency may be improved.

Further, the marker M1 contains the object information F3 showing that the marker M1 is the marker M corresponding to the cutting board O1 to the user, and the marker M2 contains the object information F3 showing that the marker M2 is the marker M corresponding to the saury O2 to the user. Therefore, the user may easily grasp that the correspondences of the plurality of markers M with the objects O.

Furthermore, the marker M1 has the image identification information N for specification of the recording location of the projection image I1 added thereto, and the marker M2 has the image identification information N for specification of the recording location of the projection image I2 added thereto. The projector 10 calculates the image identification information N added to the respective markers M from the captured image and acquires the projection image I1 and the projection image I2 from the respective recording locations based on the image identification information N. Thereby, the user may easily acquire the projection images I corresponding to the respective markers M.

For example, the user may place the objects O in arbitrary locations on the projection surface P and display the projection images I corresponding to the objects O with respect to each object O in a proximity thereof. As in the embodiment, for projection of the cooking procedure in the kitchen 20, the names and quantities of ingredients and the procedure of cooking may be displayed adjacent to the cutting board O1, and the user may proceed with the cooking while confirming the information. Further, the user may perform division into the plurality of projection areas L and adjustment of the projection sizes of the projection images I only by placing the markers M.

Second Embodiment

As below, a second embodiment of the present disclosure will be explained. In the following exemplified embodiment, regarding the elements having the same operations and functions as those of the first embodiment, the detailed explanation of the respective elements will be appropriately omitted using the signs used in the description of the first embodiment. In the first embodiment, the user places the plurality of markers M in line and the projection device 12 displays the projection images I corresponding to the respective markers M arranged according to the arrangement direction of the markers M. On the other hand, in the second embodiment, with reference to the markers M, images corresponding to the markers M can be displayed in individual positions.

Figure 12:
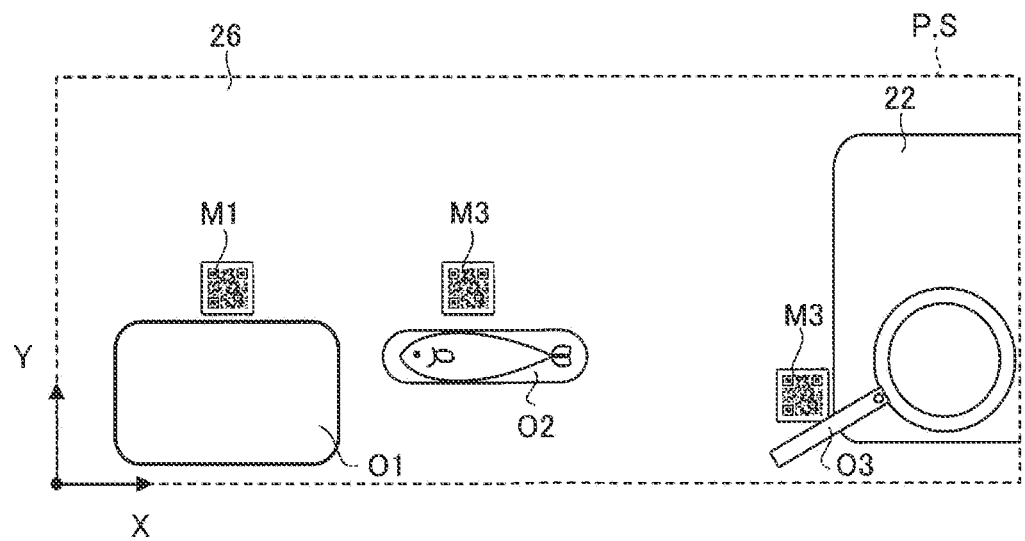
FIG. 12 schematically shows an arrangement state of markers in a second embodiment.

FIG. 12 schematically shows an arrangement state of markers M in the second embodiment. In the second embodiment, the projection surface P and the imaging area S contain the entire area of the cooking counter 26 and a part of the cooking range 22. The objects O are the cutting board O1, the saury O2, and the frying pan O3 like the first embodiment. That is, when the marker M1 is a first marker, the marker M2 is a second marker, and the marker M3 is a third marker, the imaging device 11 images a captured image containing the third marker placed on the projection surface P in addition to the first marker and the second marker.

Figure 13:
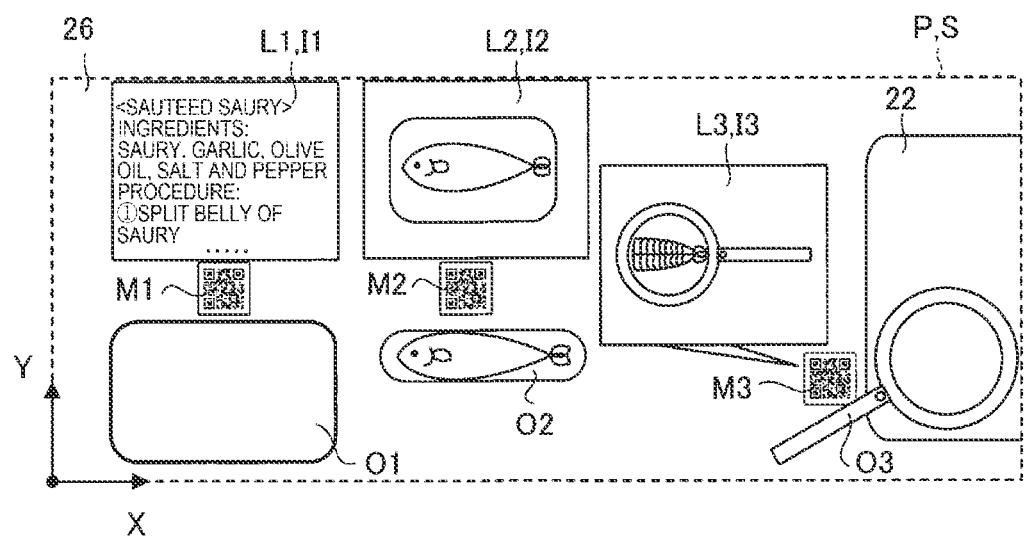
FIG. 13 schematically shows an arrangement of projection images in the second embodiment.

Generally, the frying pan O3 is more frequently used on the cooking range 22 and less frequently used on the cooking counter 26. For example, as shown in FIG. 13, the cutting board O1 and the saury O2 may be placed on the cooking counter 26 and the frying pan O3 may be placed on the cooking range 22. In this case, it is difficult to arrange the markers M corresponding to the respective objects O in line like the first embodiment. Therefore, in the second embodiment, a projection image I corresponding to a specific object O can be displayed singly regardless of the positions of the other markers M.

Figure 14A:
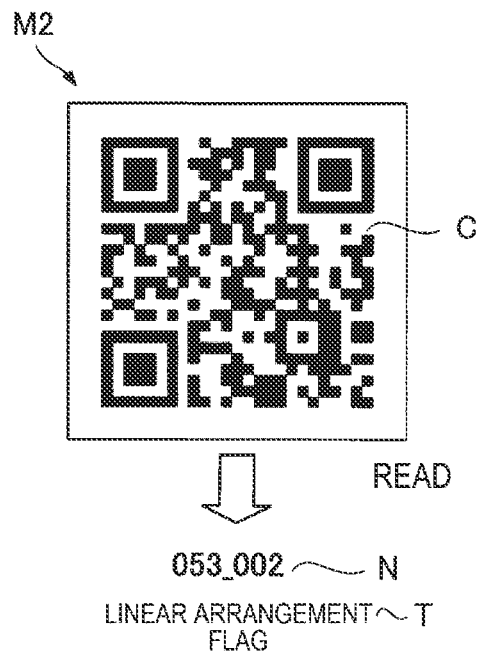
FIGS. 14A and 14B schematically show an appearance etc. of a marker in the second embodiment.
Figure 14B:
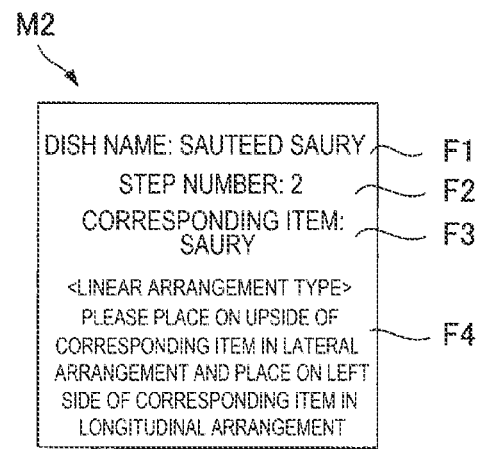
Figure 15A:
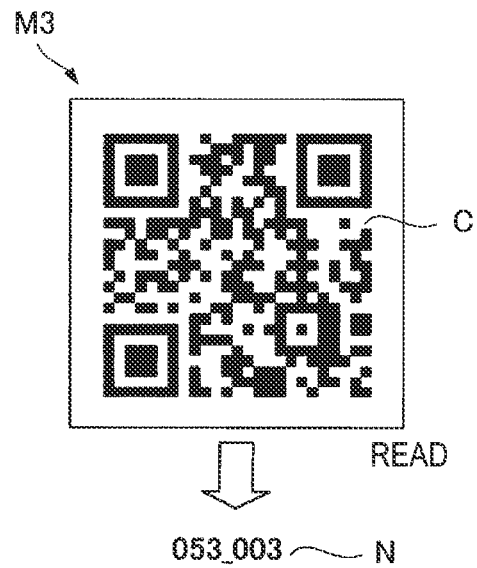
FIGS. 15A and 15B schematically show an appearance etc. of a marker in the second embodiment.
Figure 15B:
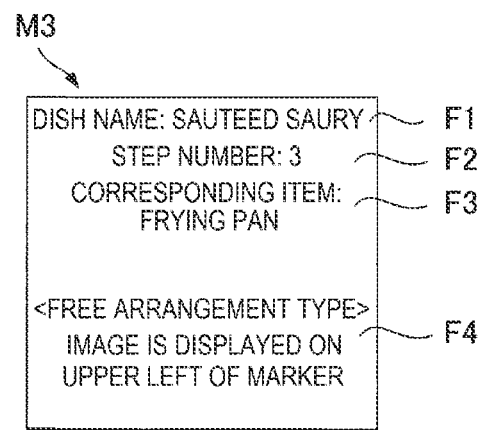

FIGS. 14A, 14B, 15A, 15B schematically show appearances etc. of markers M in the second embodiment. More specifically, FIG. 14A shows the front face of the marker M2 corresponding to the saury O2, and FIG. 14B shows the back face of the marker M2. FIG. 15A shows the front face of the marker M3 corresponding to the frying pan O3, and FIG. 15B shows the back face of the marker M3.

First, the description on the back faces of the respective markers M2, M3 are explained. As shown in FIGS. 14B and 15B, information for user F (F1 to F4) as information for the user is added to the back faces of the markers M. Of the information, the contents of the dish name information F1, the step number information F2, and the object information F3 are the same as those of the first embodiment.

On the other hand, the arrangement information F4 is different from that of the first embodiment, and an arrangement type of the respective markers M is described therein. As shown in FIG. 14B, "linear arrangement type" is described in the arrangement information F4 of the marker M2 and the position of the marker M with respect to the object O is described like the first embodiment. The linear arrangement type is a type to which markers M supposed to be arranged side by side with the other markers M belong like the first embodiment. In the embodiment, the marker M1 is of the linear arrangement type like the marker M2. That is, the cutting board O1 and the saury O2 are predicted to be arranged side by side on the cooking counter 26, and the markers M corresponding to these objects O are of the linear arrangement type.

Further, as shown in FIG. 15B, "free arrangement type" is described in the arrangement information F4 of the marker M3 and position information representing the position of the projection image I with respect to the marker M is described. In the example of FIG. 15B, as the position information, the projection image I projected on "upper left" of the marker M3 is described. In the embodiment, the position information is information representing the display position of the projection image I3 with reference to the position of the marker M3. That is, the third marker contains the position information.

The free arrangement type is assigned to a marker M supposed to be harder or inappropriate to be arranged side by side with the other markers M. In the embodiment, since the frying pan O3 is supposed to be placed on the cooking range 22 apart from the cooking counter 26 on which the other objects O1, O2 are positioned, and the marker M3 corresponding to the frying pan O3 is of the free arrangement type.

As shown in FIGS. 14A and 15A, two-dimensional codes C are added to the front faces of the markers M2, M3 like the first embodiment. Information obtained by reading of these two-dimensional codes C includes information on arrangement type T in addition to the image identification information N. For example, the two-dimensional code C of the marker M2 shown in FIG. 14A contains a linear arrangement flag showing the linear arrangement type as the information on arrangement type T. Further, the two-dimensional code C of the marker M3 shown in FIG. 15A contains a free arrangement flag showing the free arrangement type and information designating the display position of the projection image I with respect to the marker M as the information on arrangement type T. In the example of FIG. 15A, "upper left" is contained as the information designating the display position.

In the second embodiment, the image arrangement determiner 163 determines the arrangement of the projection images I on the projection surface P based on the information on arrangement type T. More specifically, when the marker M is of the linear arrangement type, the image arrangement determiner 163 determines the arrangement direction of the projection image I based on the arrangement direction of the markers M. Alternatively, when the marker M is of the free arrangement type, the image arrangement determiner 163 determines the display position of the projection image I based on the position of the marker M in the captured image and the information designating the display position contained in the information on arrangement type T. The display controller 164 controls the projection device 12 to project the projection images I on the projection surface P along the arrangement determined by the image arrangement determiner 163 like the first embodiment.

FIG. 13 schematically shows an arrangement of the projection images I in the second embodiment. The projection images I1 and I2 corresponding to the markers M1 and M2 of the linear arrangement type are displayed side by side in the lateral direction. On the other hand, the projection image I3 corresponding to the marker M3 of the free arrangement type is not displayed side by side with the other images, but displayed on the upper left of the marker M3. That is, when the projection image I3 is a third image, displaying the projection image I further includes displaying the third image corresponding to the third marker M3 in the position corresponding to the position information.

Note that, in the above described explanation, only the marker M3 corresponding to the frying pan O3 is of the free arrangement type, however, all markers may be of the free arrangement type.

As described above, according to the second embodiment, the projector 10 may display the projection image I corresponding to the marker M of the free arrangement type in an arbitrary position. Therefore, for example, even when a use position of a predetermined object O is apart from a use position of another object O, the user may display a projection image I corresponding to the predetermined object O in an arbitrary position and the work efficiency may be further improved.

Third Embodiment

As below, a third embodiment of the present disclosure will be explained. In the following exemplified embodiment, regarding the elements having the same operations and functions as those of the first embodiment or the second embodiment, the detailed explanation of the respective elements will be appropriately omitted using the signs used in the description of the first embodiment or the second embodiment.

In the first embodiment and the second embodiment, the projection area L of the projection image I is determined based on the position of the marker M and the position of the object O is not considered. In the third embodiment, the projection area L of the projection image I is determined based on the position of the object O on the projection surface P.

Figure 16A:
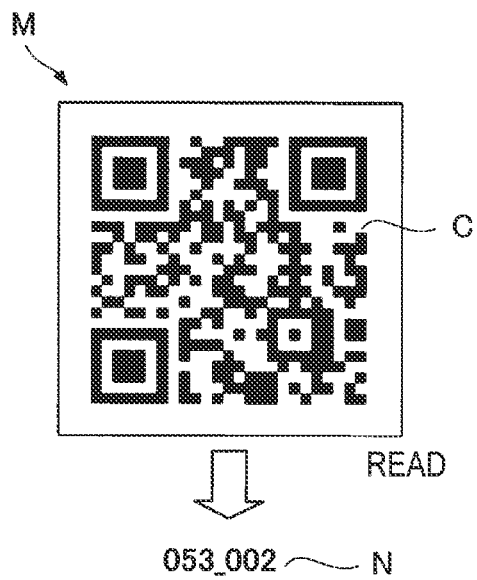
FIGS. 16A and 16B schematically show an appearance etc. of a marker in a third embodiment.
Figure 16B:
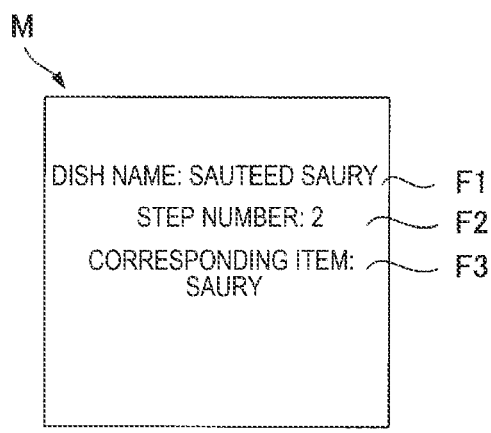

FIGS. 16A and 16B schematically show an appearance etc. of a marker M in the third embodiment. The third embodiment is different from the other embodiments in that the arrangement information F4 is not described on the back face of the marker M shown in FIG. 16B. This is because the display position of the projection image I with respect to the marker M is dynamically changed according to presence or absence of an object O around. Further, a two-dimensional code C is added to the front face of the marker M shown in FIG. 16A like the first embodiment. Information obtained by reading of the two-dimensional code C is the image identification information N like the first embodiment.

Figure 17:
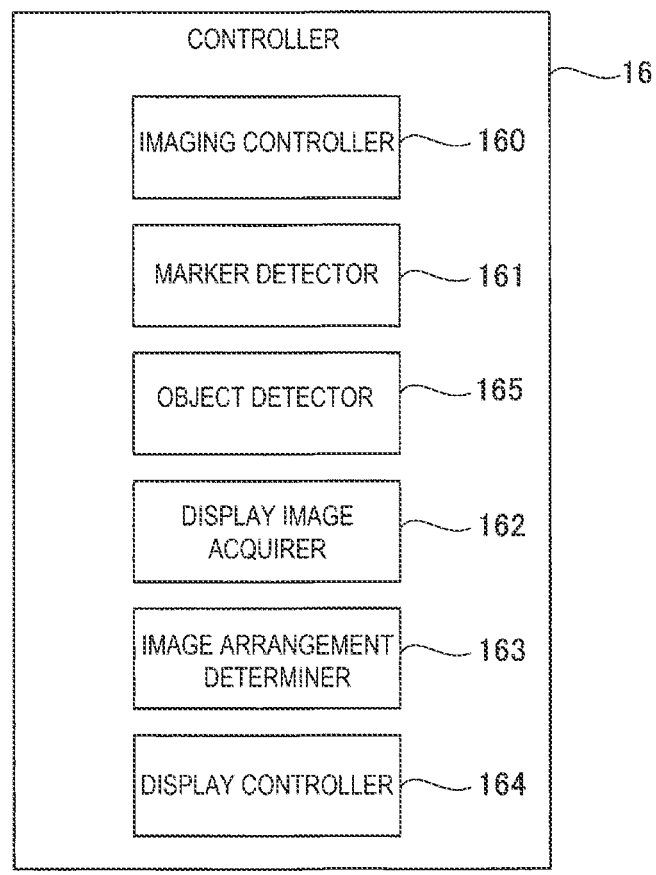
FIG. 17 is a block diagram showing a functional configuration of the controller in the third embodiment.

FIG. 17 is a block diagram showing a functional configuration of the controller 16 according to the third embodiment. In the third embodiment, an object detector 165 is provided in addition to the functional configuration shown in FIG. 3. The object detector 165 detects objects placed on the projection surface P from the captured image. That is, when the marker M1 is a first marker, the marker M2 is a second marker, and the objects O placed on the projection surface P are objects, the object detector 165 detects an area of an image corresponding to the objects placed around the first marker and the second marker from the captured image.

Various techniques of detecting an object from a captured image are known, and the explanation of the details of processing by the object detector 165 is omitted. Generally, the projection surface P is uniform in color tone or the like, and it is considered that the detection of the objects O by the object detector 165 may be performed relatively accurately. Note that the object detected by the object detector 165 is not limited to the object O correlated with the marker M. It is only necessary for the object detector 165 to detect an item as an obstacle for display of the projection image I. That is, the above described object is not limited to the object O correlated with the marker M, but may be an arbitrary item placed on the projection surface P.

Figure 18:
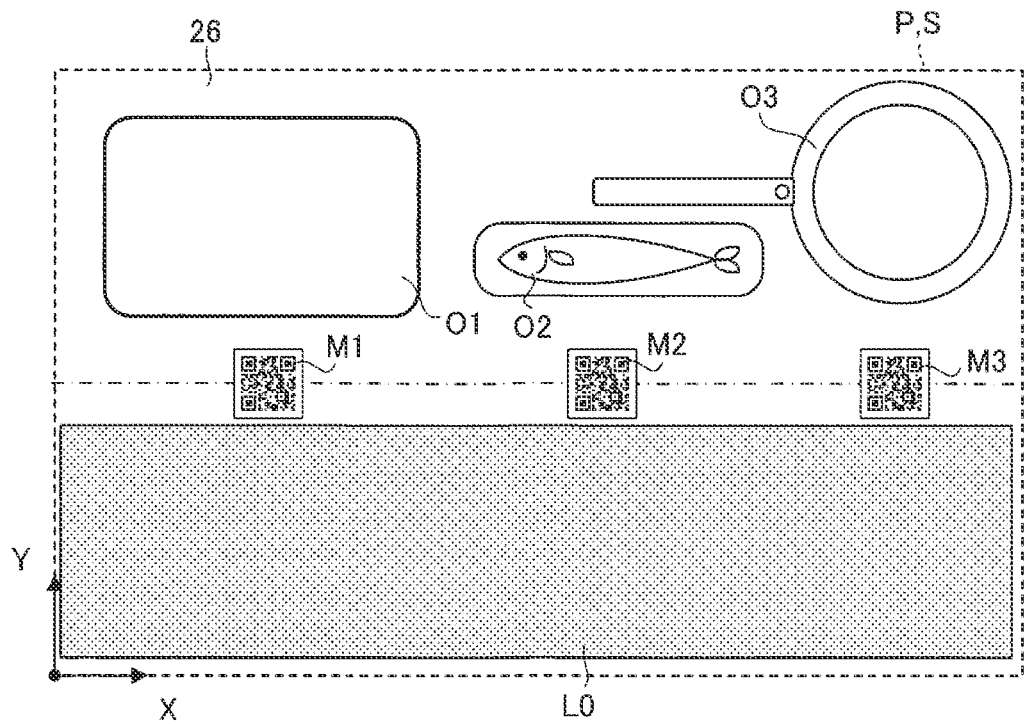
FIG. 18 schematically shows an arrangement example of markers and objects in the third embodiment.

FIG. 18 schematically shows an arrangement example of markers M and objects O in the third embodiment. In the example of FIG. 18, the cutting board O1, the saury O2, and the frying pan O3 are sequentially arranged from left to right on the deep side on the projection surface P. Further, the markers M1 to M3 corresponding to the respective objects O1 to O3 are placed at the near sides of the objects O. The marker detector 161 detects the markers M from the captured image obtained by imaging of the projection surface P. The object detector 165 detects the objects O from the captured image obtained by imaging of the projection surface P.

In the third embodiment, the image arrangement determiner 163 determines the display positions of the projection images I based on the arrangement of the plurality of markers M in the captured image and the placement areas of the objects O in the captured image. That is, when the projection image I1 is a first image and the projection image I2 is a second image, the image arrangement determiner 163 determines the display areas for displaying the first image and the second image based on the arrangement of the first marker and the second marker in the captured image and the areas of the images corresponding to the objects O.

More specifically, the image arrangement determiner 163 determines the arrangement direction of the projection images I based on the positions of the markers M detected by the marker detector 161. For example, when the plurality of markers M1 to M3 are arranged in the lateral direction as shown in FIG. 18, the image arrangement determiner 163 determines that the projection images I1 to I3 corresponding to these markers M1 to M3 are displayed in the arrangement in the lateral direction.

Further, the image arrangement determiner 163 determines the projection positions of the projection images I based on the arrangement areas of the objects O detected by the object detector 165. For example, when the objects O are arranged side by side on the projection surface P at the deep side of the markers M1 to M3 as shown in FIG. 18, the image arrangement determiner 163 determines the area at the near side of the markers M1 to M3 as the projection area L0.

Figure 19:
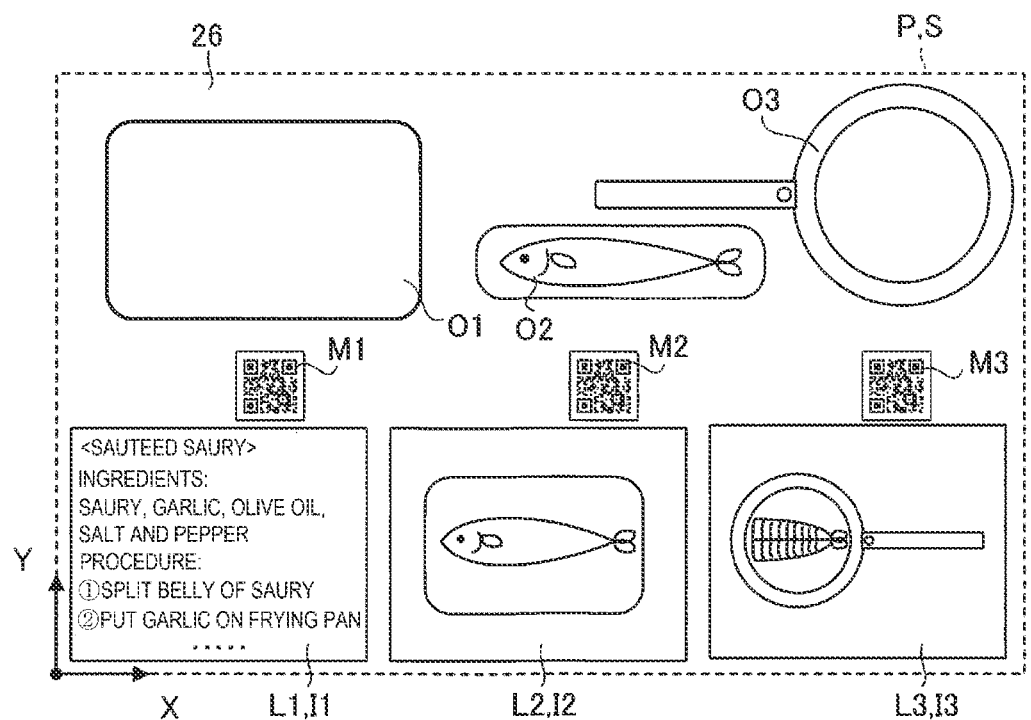
FIG. 19 schematically shows an arrangement of projection images in the third embodiment.

As shown in FIG. 19, the image arrangement determiner 163 divides the projection area L0 in three parts in the lateral direction and respectively sets the projection area L1 where the projection image I1 corresponding to the marker M1 is projected, the projection area L2 where the projection image I2 corresponding to the marker M2 is projected, and the projection area L3 where the projection image I3 corresponding to the marker M3 is projected.

The display controller 164 controls the projection device 12 to project the projection images I1 to I3 on the projection surface P along the arrangement determined by the image arrangement determiner 163. That is, the first image and the second image are displayed based on the display areas determined by the image arrangement determiner 163.

Figure 20:
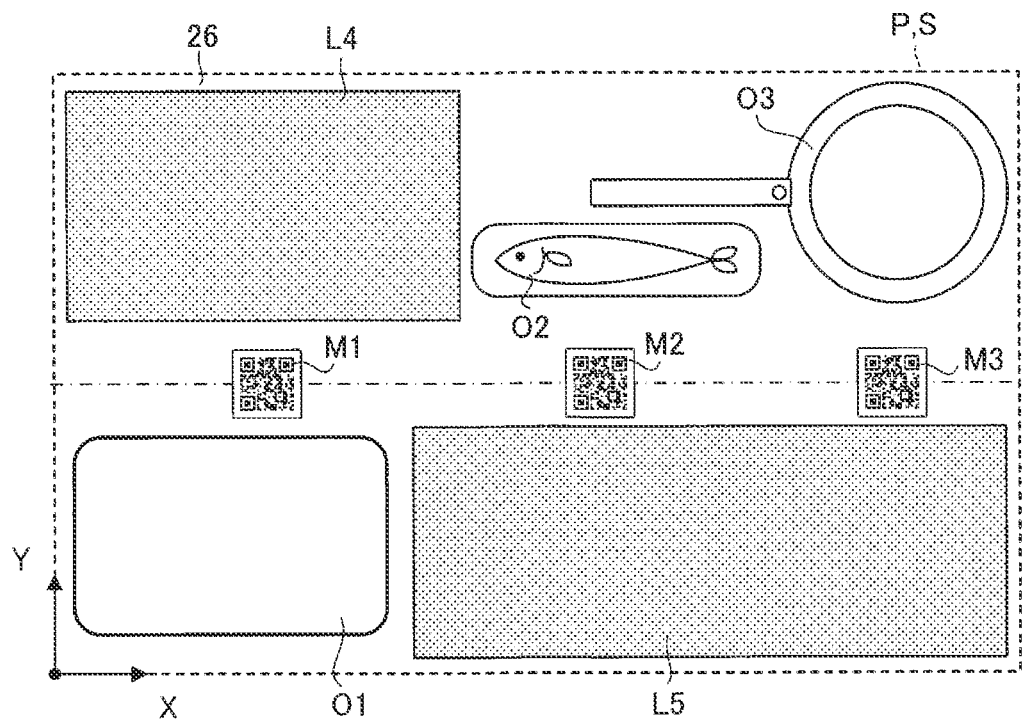
FIG. 20 schematically shows another arrangement example of markers and objects in the third embodiment.

FIG. 20 schematically shows another arrangement example of markers M and objects O in the third embodiment. In the example of FIG. 20, the positions of the markers M1 to M3 are substantially the same as those in FIG. 18. That is, the markers M1 to M3 are arranged in the lateral direction nearly at the center part in the depth direction of the projection surface P. On the other hand, the positions of the objects O are different from those in FIG. 18. That is, the cutting board O1 as the object O corresponding to the marker M1 is placed at the near side of the marker M1. The saury O2 as the object O corresponding to the marker M2 is placed at the deep side of the marker M2. The frying pan O3 as the object O corresponding to the marker M3 is placed at the deep side of the marker M3.

Also, in this case, the image arrangement determiner 163 first determines the arrangement direction of the projection images I based on the positions of the markers M detected by the marker detector 161. In the example of FIG. 20, the markers M1 to M3 are arranged in the lateral direction like those in FIG. 18, and the image arrangement determiner 163 determines that the projection images I1 to I3 corresponding to these markers M1 to M3 are displayed in the arrangement in the lateral direction.

Further, the image arrangement determiner 163 determines the projection positions of the projection images I based on the positions of the objects O detected by the object detector 165. In FIG. 20, areas where no objects O are placed on the projection surface P are an area L4 located at the opposite side to the cutting board O1 with the marker M1 in between and an area L5 located at the opposite side to the saury O2 and the frying pan O3 with the markers M2 and M3 in between.

Figure 21:
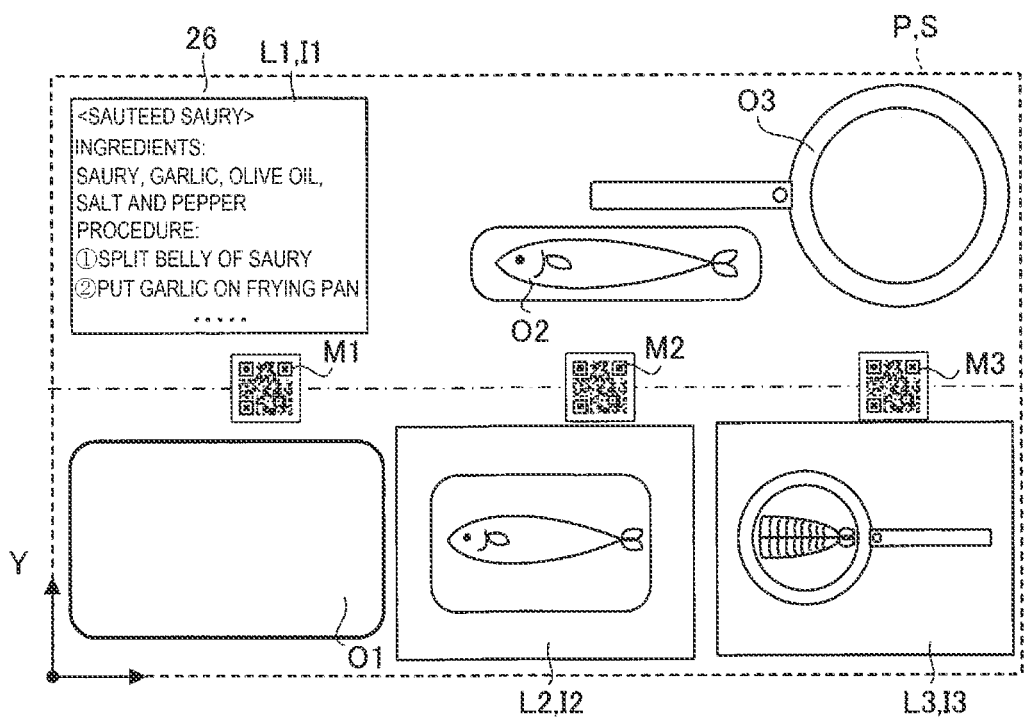
FIG. 21 schematically shows another arrangement of projection images in the third embodiment.

In this case, as shown in FIG. 21, the image arrangement determiner 163 determines the area L4 located at the opposite side to the cutting board O1 with the marker M1 in between as the projection area L1 where the projection image I1 is projected. Further, the image arrangement determiner 163 divides the area L5 located at the opposite side to the saury O2 and the frying pan O3 with the markers M2 and M3 in between into two areas and determines the areas as the projection area L2 where the projection image I2 is projected and the projection area L3 where the projection image I3 is projected. The display controller 164 controls the projection device 12 to project the projection images I1 to I3 on the projection surface P along the arrangement determined by the image arrangement determiner 163.

Note that, for example, when some object O is placed in the position of the area L4 in FIG. 20, the image arrangement determiner 163 may divide the area L5 into three areas and set the projection areas L1 to L3. Alternatively, for example, when many objects O are placed on the projection surface P and the projection area L is not sufficiently obtained, the controller 16 may present a message "remove objects from projection surface or reduce number of markers" or the like to the user.

As described above, the projector 10 according to the third embodiment determines the display positions of the projection images I based on the arrangement areas of the objects O in the captured image in addition to the positions of the plurality of markers M in the captured image. Specifically, for example, of the projection surface P, an area with no object O placed therein is referred to as an empty space. When there is an adjacent empty space to the marker M, the projection image I is displayed in the empty space. Alternatively, when there is no adjacent empty space to the marker M, the projection image I is displayed in the closest empty space to the marker M. Thereby, the projection area L is set to be superimposed on the object O, and lowering of visibility of the projection image I may be prevented and the user may grasp the contents of the projection image I more reliably.

MODIFIED EXAMPLES

The respective embodiments exemplified as above may be variously modified. Specific modified configurations that may be applied to the above described respective embodiments will be exemplified as below. Two or more configurations arbitrarily selected from the following exemplifications may be appropriately combined with mutual consistency.

Modified Example 1

In the embodiment, the projector 10 displays the images relating to the cooking procedure in the kitchen 20, however, may display images relating to other kinds of work and procedures. For example, the projector 10 may be used for displaying images relating to a procedure of craft making and how to use tools in DIY (Do It Yourself). Alternatively, for example, the projector 10 may be used for displaying educational materials, experimental images, etc. in remote class.

Modified Example 2

Figure 22:
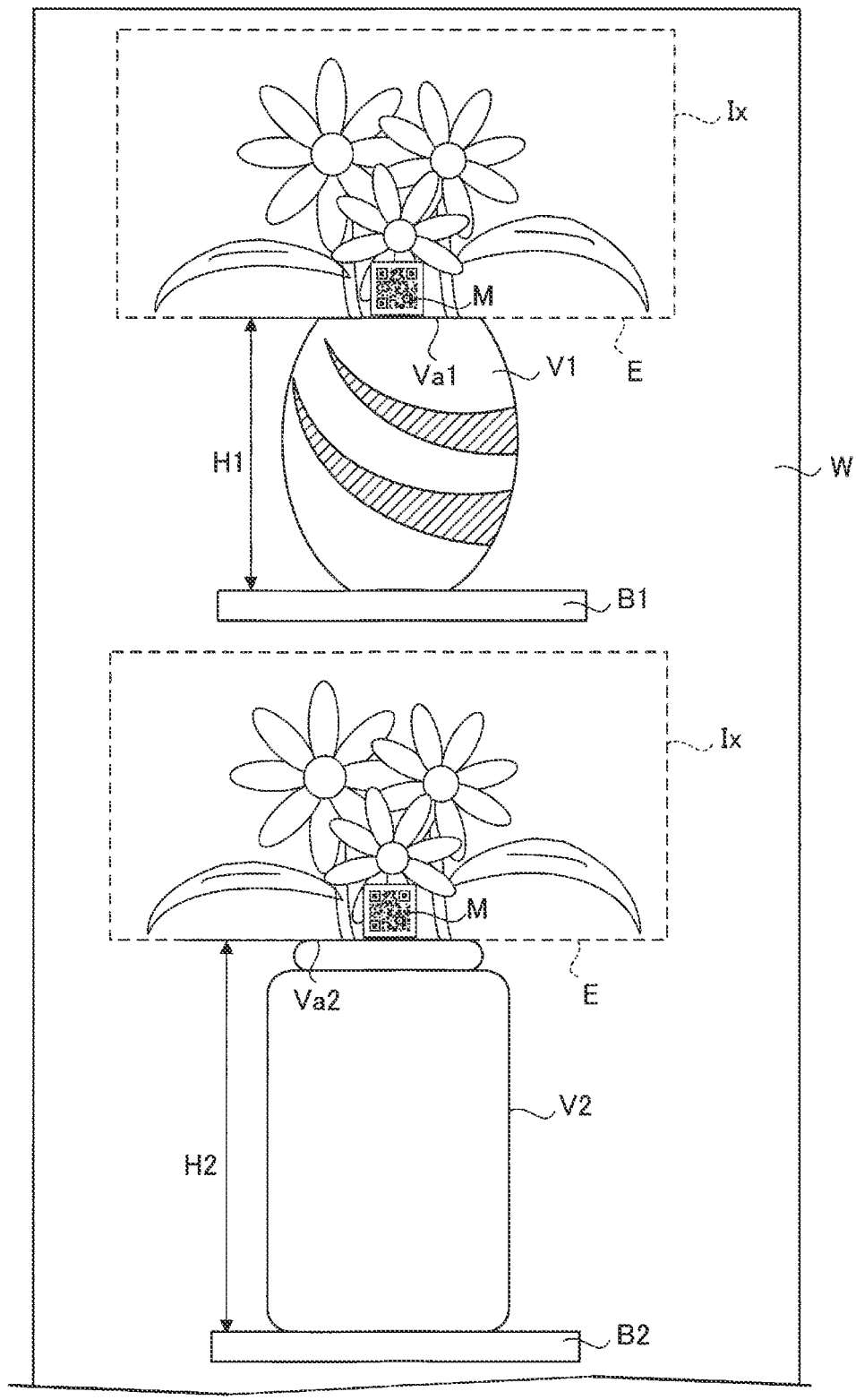
FIG. 22 schematically shows a show window display using the projector.

The projector 10 may be used for e.g. signage use. FIG. 22 schematically shows a show window display using the projector 10. In FIG. 22, a case where vases V (V1, V2) are displayed on a wall W of a store is taken as an example. The vases V1, V2 are mounted on shelf boards B1, B2 projecting perpendicularly from the wall W, respectively. On the wall W on the back of the vases V1, V2, flower images Ix are respectively displayed by the projector 10. The vases V1, V2 and the images Ix are viewed in combination, and thereby, customers of the store may picture the use of the vases V1 and V2 more specifically. Therefore, it is considered that the customer appetite of shopping is increased more easily than that in a case where the vases V1, V2 are simply displayed.

Here, for display as shown in FIG. 22, it is necessary to align lower ends E of the images Ix with the heights of mouths Va1, Va2 of the vases V1, V2. However, the positions of the mouths Va1, Va2 of the vases V1, V2, i.e., heights H1, H2 as distances from the shelf boards B1, B2 to the mouths Va1, Va2 vary depending on types of vases. Accordingly, it is necessary for a person in charge of the show window of the store to adjust the display positions of the images Ix at each time when the vases V are changed and the work is complex.

The display positions of the images Ix can be designated by the markers M using the projector 10, and thereby, the display positions of the images Ix may be simply adjusted. For example, the projector 10 is adjusted to display the images Ix to align the lower ends of the markers M and the lower ends E of the images Ix, and thereby, the display as shown in FIG. 22 may be performed by attachment of the markers M to positions of the wall W on the back of the mouths Va1, Va2 of the vases V1, V2. Alternatively, for example, two-dimensional code information of the markers M may contain information for designating the display positions of the images Ix that "align lower sides of markers M with lower sides of images Ix". Alternatively, according to modified example 2, the contents of the images Ix may be changed by reattachment of the markers M, and thereby, for example, the images Ix may be changed with season, specifically, the images may be easily replaced by images of flowers in season.

As described above, the display positions of images and images may be easily replaced even by a user having no technical expertise using the projector 10, and signage using images may be readily performed.

Modified Example 3

In the embodiment, the projector 10 includes the imaging device 11 and the projection device 12, however, these may be separately provided. For example, an imaging device, a projection device, and an information processing apparatus as respectively independent devices may be wiredly or wirelessly connected to form a display system. The information processing apparatus may be a personal computer or a smartphone. Alternatively, the imaging device in the display system may be an imaging device of an information processing apparatus such as a personal computer or a smartphone.

Modified Example 4

In the embodiment, the image server 30 receiving the image transmission request containing the image identification information N searches for the projection image I corresponding to the image identification information N from the database DB and returns the image. However, for example, an address of a memory location of a predetermined projection image I may be added to the marker M as the image identification information N, and the display image acquirer 162 may request transmission of the projection image I stored at the address to the image server 30. The address of the memory location of the projection image I may be e.g. a URL (Uniform Resource Locator).

What is claimed is:

1. A display method comprising:

capturing a capture image containing a first marker placed on a surface and a second marker placed on the surface, wherein the first marker and the second marker are physical objects having a first side and a second side, the first side including a computer-readable code indicating each of the first marker and the second marker are associated with a unique item and the second side including an indication showing that the first marker is a marker corresponding to a first unique object to a user of the first marker and the second marker is a marker corresponding to a second unique object to the user of the second marker, wherein the first marker is placed in proximity to a first object on the surface and the second marker is placed in proximity to a second object on the surface; and displaying, on the surface, a first image corresponding to the first marker and a second image corresponding to the second marker in an arrangement corresponding to an arrangement of the first marker and the second marker in the capture image.

2. The display method according to claim 1, wherein in the displaying, an arrangement direction of the first image and the second image on the surface is the same as an arrangement direction of the first marker and the second marker in the capture image.

3. The display method according to claim 1, wherein the first marker corresponds to a first object used for work performed by a user, the second marker corresponds to a second object used for the work, the first image is an image relating to details of the work using the first object, and the second image is an image relating to details of the work using the second object.

4. The display method according to claim 1, wherein first information used for specification of a recording location of the first image is added to the first marker, and second information used for specification of a recording location of the second image is added to the second marker, the method further comprising:

acquiring the first information and the second information based on the capture image;

acquiring the first image from the recording location of the first image based on the first information; and acquiring the second image from the recording location of the second image based on the second information.

5. The display method according to claim 1, wherein the capturing includes capturing the capture image containing the first marker, the second marker, and a third marker placed on the surface, wherein the third marker is a physical object having a third side and a fourth side, the third side including a computer-readable code indicating the third marker is associated with a unique item and the fourth side including an indication showing that the third marker is a marker corresponding to a third unique object to the user of the third marker, wherein the third marker is placed in proximity to a third object on the surface;

the third marker contains position information, and the displaying further includes displaying a third image corresponding to the third marker in a position corresponding to the position information.

6. A display system comprising:

a camera for capturing a capture image containing a first marker placed on a projection surface and a second marker placed on the projection surface, wherein the first marker and the second marker are physical objects having a first side and a second side, the first side including a computer-readable code indicating each of the first marker and the second marker are associated with a unique item and the second side including an indication showing that the first marker is a marker corresponding to a first unique object to a user of the first marker and the second marker is a marker corresponding to a second unique object to the user of the second marker, wherein the first marker is placed in proximity to a first object on the surface and the second marker is placed in proximity to a second object on the surface; and a projector for displaying a first image corresponding to the first marker and a second image corresponding to the second marker in an arrangement corresponding to an arrangement of the first marker and the second marker in the capture image on the projection surface.

* * * * *